(12) United States Patent
Yamaguchi et al.

(10) Patent No.: US 8,089,343 B2
(45) Date of Patent: Jan. 3, 2012

(54) SMART ENTRY SYSTEM

(75) Inventors: Taichi Yamaguchi, Obu (JP); Hironori Mitsubayashi, Chita-gun (JP); Daigo Akutsu, Gifu (JP); Satoshi Nagao, Kariya (JP)

(73) Assignee: Denso Corporation, Kariya (JP)

( * ) Notice: Subject to any disclaimer, the term of this patent is extended or adjusted under 35 U.S.C. 154(b) by 321 days.

(21) Appl. No.: 12/565,876

(22) Filed: Sep. 24, 2009

(65) Prior Publication Data

US 2010/0073153 A1  Mar. 25, 2010

(30) Foreign Application Priority Data

Sep. 25, 2008  (JP) ................................ 2008-246670
Sep. 25, 2008  (JP) ................................ 2008-246671

(51) Int. Cl.
*B60R 25/00* (2006.01)
*G05B 19/00* (2006.01)
*G05B 23/00* (2006.01)
*G06F 7/00* (2006.01)
*G06F 7/04* (2006.01)
*G08B 29/00* (2006.01)

(52) U.S. Cl. ..................... 340/5.72; 340/5.61; 340/10.2; 340/5.31; 340/5.1; 340/5.64; 340/5.65

(58) Field of Classification Search ............ 340/5.1–5.2, 340/5.24, 5.31, 5.6–5.62, 5.72–5.73, 10.1–1.2, 340/10.52
See application file for complete search history.

(56) References Cited

U.S. PATENT DOCUMENTS

| | | | | |
|---|---|---|---|---|
| 5,969,597 A | * | 10/1999 | Weigl et al. ................... | 340/5.61 |
| 6,075,454 A | * | 6/2000 | Yamasaki ..................... | 340/5.61 |
| 6,552,649 B1 | * | 4/2003 | Okada et al. .................. | 340/5.61 |
| 6,700,476 B1 | * | 3/2004 | Okada et al. .................. | 340/5.62 |
| 6,995,653 B2 | * | 2/2006 | Takahashi et al. ........... | 340/5.71 |
| 6,998,958 B2 | * | 2/2006 | Asakura et al. .............. | 340/5.61 |
| 7,109,843 B2 | * | 9/2006 | Nagai et al. ................... | 340/5.72 |
| 7,425,886 B2 | * | 9/2008 | Yoshii et al. .................. | 340/5.72 |
| 7,515,034 B2 | * | 4/2009 | Inoue ............................ | 340/5.61 |
| 7,956,741 B2 | * | 6/2011 | Tamezane et al. ............ | 340/542 |
| 2003/0014164 A1 | * | 1/2003 | Shin ................................ | 701/2 |
| 2006/0012462 A1 | * | 1/2006 | Teshima et al. .............. | 340/5.61 |
| 2007/0120644 A1 | * | 5/2007 | Seike ............................ | 340/5.61 |

FOREIGN PATENT DOCUMENTS

| | | |
|---|---|---|
| JP | 07-197713 | 8/1995 |
| JP | 10-059131 | 3/1998 |
| JP | 2000-192701 | 7/2000 |
| JP | 2007-107343 | 4/2007 |
| JP | 2008-127913 | 6/2008 |

\* cited by examiner

*Primary Examiner* — Daniel Wu
*Assistant Examiner* — Son M Tang
(74) *Attorney, Agent, or Firm* — Nixon & Vanderhye PC

(57) ABSTRACT

A smart entry system includes a vehicle-side unit and a plurality of portable devices. Each of the portable devices has a discrimination code different from each other. When a first portable device is locked in a vehicle compartment, the discrimination code of the first portable device is stored in the vehicle-side unit. When the vehicle is parked in a state where all of the doors are locked, the vehicle-side unit transmits a request signal to an exterior communication area provided at an outside of the vehicle, and when the vehicle-side unit receives a response signal from a second portable device and the discrimination code of the second portable device is different from the discrimination code of the first portable device stored in the vehicle-side unit, the vehicle-side unit permits an unlock of the doors of the vehicle.

11 Claims, 8 Drawing Sheets

| PRIORITY | CONDITION |
|---|---|
| 1 | LAST USED FOR LOCKING DOOR |
| 2 | LAST USED FOR DEACTIVATING IMMOBILIZER |
| 3 | PREVIOUSLY USED |
| 4 | PREVIOUSLY UNUSED |
| KEY NOT TO BE SEARCH | LEFT IN VEHICLE COMPARTMENT |

…

SMART ENTRY SYSTEM

CROSS REFERENCE TO RELATED APPLICATIONS

The present application is based on and claims priority to Japanese Patent Applications No. 2008-246670 filed on Sep. 25, 2008 and No. 2008-246671 filed on Sep. 25, 2008, the contents of which are incorporated in their entirety herein by reference.

BACKGROUND OF THE INVENTION

1. Field of the Invention

The present invention relates to a smart entry system that includes a portable device and a vehicle-side unit communicating with each other.

2. Description of the Related Art

JP-A-10-59131 discloses a smart entry system including a vehicle-side unit and a portable device. The vehicle-side unit and the portable device communicate with each other when a switch disposed at a door handle of a vehicle door is operated. When the vehicle-side unit receives a normal response signal from the portable device, the vehicle-side unit locks the vehicle door.

In the above-described smart entry system, the vehicle-side unit outputs a low-power confirmation signal and a high-power confirmation signal so as to prevent that the portable device is left in a vehicle compartment. The portable device has a receiving area of the low-power confirmation signal set to be substantially equal to the vehicle compartment. Thus, when the vehicle-side unit receives a response signal from the portable device in response to the low-power confirmation signal, the vehicle-side unit determines that the portable device is left in the vehicle compartment. In this case, the vehicle-side unit does not lock the vehicle door and warns a user of the vehicle.

When vehicle-side unit does not receive a response signal to the low-power confirmation signal, the vehicle-side unit transmits the high-power confirmation signal. The portable device has a receiving area of the high-power confirmation signal set to include a predetermined area around the vehicle. When the vehicle-side unit receives a response signal from the portable device in response to the high-power confirmation signal, the vehicle-side unit determines that a user having the portable device is outside of the vehicle.

In the smart entry system, a plurality of the portable devices may be provided so that a plurality of users can use the vehicle. When a plurality of the portable devices is provided, there is a possibility that a user having one of the portable devices gets out of the vehicle and another one of the portable devices is left in the vehicle compartment. In this case, even if the user operates the switch at the door handle so as to lock the vehicle door, the vehicle door may be not locked and a warning may be generated so as to prevent a theft of the vehicle using the portable device left in the vehicle.

In the conventional smart entry system, a mechanical key is provided so that a use can lock and unlock the vehicle door even when a battery of the portable device runs out. In addition, the conventional smart entry system may include wireless lock function and a wireless unlock function. When the smart entry system includes the wireless lock function and the wireless unlock function, a one-way communication from the portable device to the vehicle-side unit is performed when a user operates a lock switch or an unlock switch disposed at the portable device, and thereby the vehicle door is locked or unlocked.

When the vehicle door is locked using the mechanical key or the wireless lock function, the vehicle door can be locked even when the portable device is left in the vehicle compartment. Thus, the portable device may be locked in the vehicle compartment.

In the smart entry system, a request signal is periodically transmitted to an exterior communication area provided at an outside of the vehicle so as to detect that a user having the portable device approaches the vehicle. When the portable device is in the communication area, the portable device transmits a response signal to the request signal. The vehicle-side unit detects that a user having the portable device approaches the vehicle and the vehicle-side unit unlocks the vehicle door when a touch sensor detects that the user operates the door handle.

Electric wave for providing the exterior communication area may enter the vehicle compartment and the portable device left in the vehicle compartment may transmit a response signal to the request signal for providing the exterior communication area. In this case, a person without the portable device can unlock the vehicle door. In addition, when the portable device left in the vehicle compartment continue to transmit the response signal in response to the request signal which is periodically transmitted, a battery of the portable device may be wasted. Thus, in the conventional entry system, when the vehicle door is locked, a request signal is transmitted to an interior communication area provided in the vehicle compartment and the vehicle-side unit determines whether the portable device is left in the vehicle compartment based on existence or nonexistence of a response signal from the portable device. When the vehicle-side unit determines that the portable device is left in the vehicle compartment, the vehicle-side unit stops transmitting the request signal for providing the exterior communication area so that the person without the portable device cannot unlock the vehicle door.

When the vehicle-side unit completely stops transmitting the request signal for providing the exterior communication area, even when a user has a portable device other than the portable device left in the vehicle compartment, the user cannot unlock the vehicle door using the smart entry system.

SUMMARY OF THE INVENTION

In view of the foregoing problems, it is an object of the present invention to provide a smart entry system in which a person having a portable device can unlock a vehicle door using the smart entry system even if another portable device is left in a vehicle compartment.

A smart entry system according to a first aspect of the present invention includes a vehicle-side unit and a plurality of portable devices. The vehicle-side unit includes an exterior transmitter, an interior transmitter, a receiver, a discrimination code storing portion, an unlock permitting portion, and an unlocking portion. The exterior transmitter is configured to transmit a request signal to an exterior communication area provided at an outside of a vehicle. The interior transmitter is configured to transmit a request signal to an interior communication area provided in a vehicle compartment of the vehicle. Each of the plurality of portable devices has a discrimination code different from each other. Each of the plurality of portable devices is configured to transmit a response signal including an ID code in response to the request signal from the vehicle-side unit.

When all of doors of the vehicle are locked, the discrimination code storing portion controls the interior transmitter to transmit the request signal. When the receiver receives the response signal from a first portable device of the plurality of portable devices in response to the request signal from the interior transmitter and the discrimination code storing portion receives the discrimination code of the first portable device through a communication of the first portable device, the discrimination code storing portion stores the discrimination code of the first portable device.

When the vehicle is parked in a state where all of the doors are locked, the unlock permitting portion controls the exterior transmitter to periodically-transmit the request signal. When the receiver receives the response signal from a second portable device of the plurality of portable devices in response to the request signal from the exterior transmitter and the unlock permitting portion receives the discrimination code of the second portable device through a communication with a second portable device, the unlock permitting portion controls the exterior transmitter to continue to periodically-transmit the request signal on a condition that the discrimination code of the second portable device is different from the discrimination code of the first portable device stored in the discrimination code storing portion.

When the exterior transmitter periodically-transmits the request signal, the receiver receives the response signal from a third portable device of the plurality of portable devices in response to the request signal from the exterior transmitter and the ID code included in the response signal corresponds to an ID code previously registered in the vehicle-side unit, the unlock permitting portion permits an unlocking of one of the doors which a user having the third portable device approaches. The unlocking portion unlocks the one of the doors based on a permission by the unlock permitting portion.

The smart entry system according to the first aspect of the invention can prevent that a person without a portable device unlocks the doors of the vehicle even when a portable device is left in the vehicle compartment. In addition, a person having a portable device can unlock the doors of the vehicle using the smart entry system even when another portable device is left in a vehicle compartment.

A smart entry system according to a second aspect of the present invention includes a vehicle-side unit and a plurality of portable devices. The vehicle-side unit includes an exterior transmitter, an interior transmitter, a receiver, a discrimination code storing portion, an operated portion, a first unlock control portion, and a second unlock control portion. The exterior transmitter is configured to transmit a request signal to an exterior communication area provided at an outside of a vehicle. The interior transmitter is configured to transmit a request signal to an interior communication area provided in a vehicle compartment of the vehicle. The operated portion is attached to one of doors of the vehicle to be operated by a user for unlocking the one of the doors. Each of TO the plurality of portable devices has a discrimination code different from each other. Each of the plurality of portable devices is configured to transmit a response signal including an ID code in response to the request signal from the vehicle-side unit.

When all of the doors are locked, the discrimination code storing portion controls the interior transmitter to transmit the request signal, and when the receiver receives the response signal from a first portable device of the plurality of portable devices and discrimination code storing portion receives the discrimination code of the first portable device through a communication with the first portable device, the discrimination code storing portion stores the discrimination code of the first portable device.

When the vehicle is parked in a state where all of the doors are locked, the first unlock control portion controls the exterior transmitter to periodically-transmit the request signal, and when the receiver receives the response signal from a second portable device of the plurality of portable devices, the first unlock control portion receives the discrimination code of the second portable device through a communication with the second portable device, and the discrimination code of the second portable device corresponds to the discrimination code of the first portable device stored in the discrimination code storing portion, the first unlock control portion controls the exterior transmitter to stop periodically-transmitting the request signal.

When the exterior transmitter periodically-transmits the request signal, the receiver receives the response signal from a third portable device of the plurality of portable devices, the ID code included in the response signal corresponds to an ID code previously registered in the vehicle-side unit, and a user having the third portable device operates the operated portion, the first unlock control portion unlocks the one of the doors.

When the exterior transmitter stops periodically-transmitting the request signal and the operated portion is operated, the second unlock control portion controls the exterior transmitter to transmit the request signal, and when the receiver receives the response signal from a fourth portable device of the plurality of portable devices, the second unlock control portion receives the discrimination code of the fourth portable device through a communication with the fourth portable device, the discrimination code of the fourth portable device is different from the discrimination code of the first portable device stored in the discrimination code storing portion, and the ID code included in the response signal corresponds to the ID code previously registered in the vehicle-side unit, the second unlock control portion unlocks the one of the doors.

The smart entry system according to the second aspect of the invention can prevent the doors of the vehicle from being unlocked by a person without a portable device even when a portable device is locked in the vehicle compartment. In addition, a person having a portable device can unlock the doors of the vehicle using the smart entry system even when another portable device is left in a vehicle compartment.

BRIEF DESCRIPTION OF THE DRAWINGS

Additional objects and advantages of the present invention will be more readily apparent from the following detailed description of exemplary embodiments when taken together with the accompanying drawings. In the drawings.

DETAILED DESCRIPTION OF THE EXEMPLARY EMBODIMENTS

First Embodiment

A smart entry system according to a first embodiment of the present invention will be described with reference to FIG. 1.

A smart entry system according to the present embodiment controls a locking/unlocking state of each door of a vehicle 10 based on verification result of an ID code in a communication between a portable device 1 and a vehicle-side unit. In order to improve a safety of the vehicle 10, the vehicle-side unit controls an allowing/prohibiting state of an engine starting of the vehicle 10 based on the verification result of the ID code.

Figure 1:
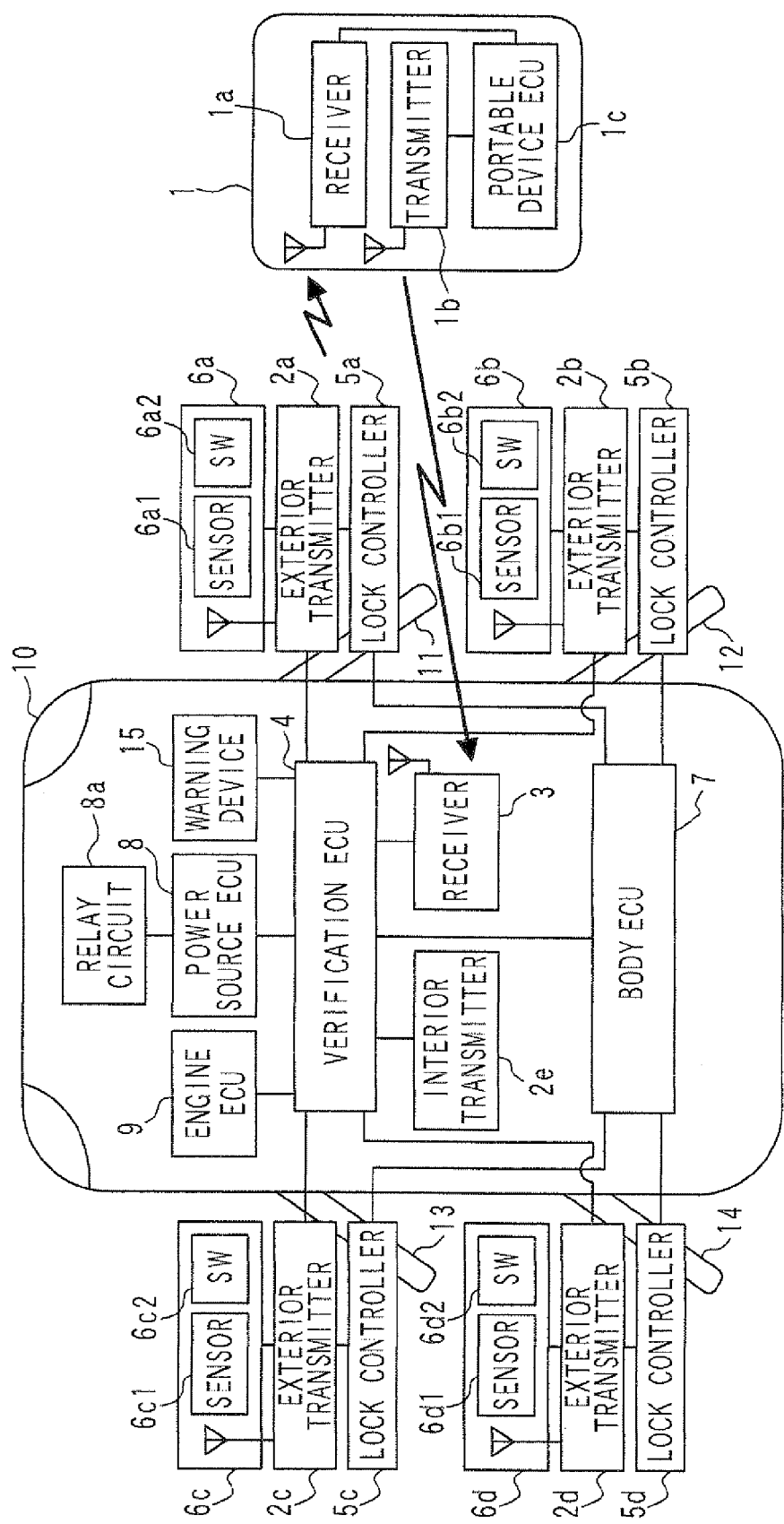
FIG. 1 is a block diagram illustrating a smart entry system according to a first embodiment of the present invention.

As shown in FIG. 1, the portable device 1 includes a receiver 1a, a transmitter 1b, and a portable device ECU 1c. The receiver 1a receives a request signal from exterior transmitters 2a-2d or an interior transmitter 2e in the vehicle-side unit. The transmitter 1b transmits a response signal including the ID code in response to the request signal. The portable device ECU 1c is coupled with the receiver 1a and the transmitter 1b. The portable device ECU 1c determines whether the receiver 1a receives the request signal based on a receiving signal of the receiver 1a. In addition, the portable device ECU 1c generates the response signal including an ID code in response to the request signal and controls the transmitter 1b to transmit the response signal.

The smart entry system may include a plurality of the portable devices 1. For example, the smart entry system may include four portable devices 1. Each of the portable devices 1 has an electric configuration similar to each other. Each of the portable devices 1 stores a vehicle code, a key number code, and an ID code. The vehicle code indicates a vehicle to which the smart entry system is provided. The key number code indicates a key number of each of the portable devices 1. The vehicle code is common among the portable devices 1. The key number code and the ID code are unique to each of the portable devices 1.

Each of the portable devices 1 includes a mechanical key so that vehicle doors 11-14 can be locked and unlocked even when a battery of each of the portable devices 1 runs out. Furthermore, each of the portable device 1 has a lock switch and an unlock switch (not shown). When a user operates the lock switch or the unlock switch, the portable device 1 transmits a lock order signal or an unlock order signal to the vehicle-side unit (one-way communication). Each of the lock order signal and the unlock order signal includes the ID code. When an verification of the ID code is satisfied, the vehicle doors 11-14 are locked or unlocked in response to the lock order signal or the unlock order signal. Thus, the smart entry system according to the present embodiment includes a wireless lock function and a wireless unlock function.

The vehicle-side unit includes the exterior transmitters 2a-2d and the interior transmitter 2e. The exterior transmitters 2a-2d are disposed at the vehicle doors 11-14, respectively. The interior transmitter 2e is disposed in a vehicle compartment. Each of the exterior transmitters 2a-2d and the interior transmitter 2e transmits the request signal based on a transmission order signal from a verification ECU 4 in the vehicle-side unit.

Figure 2:
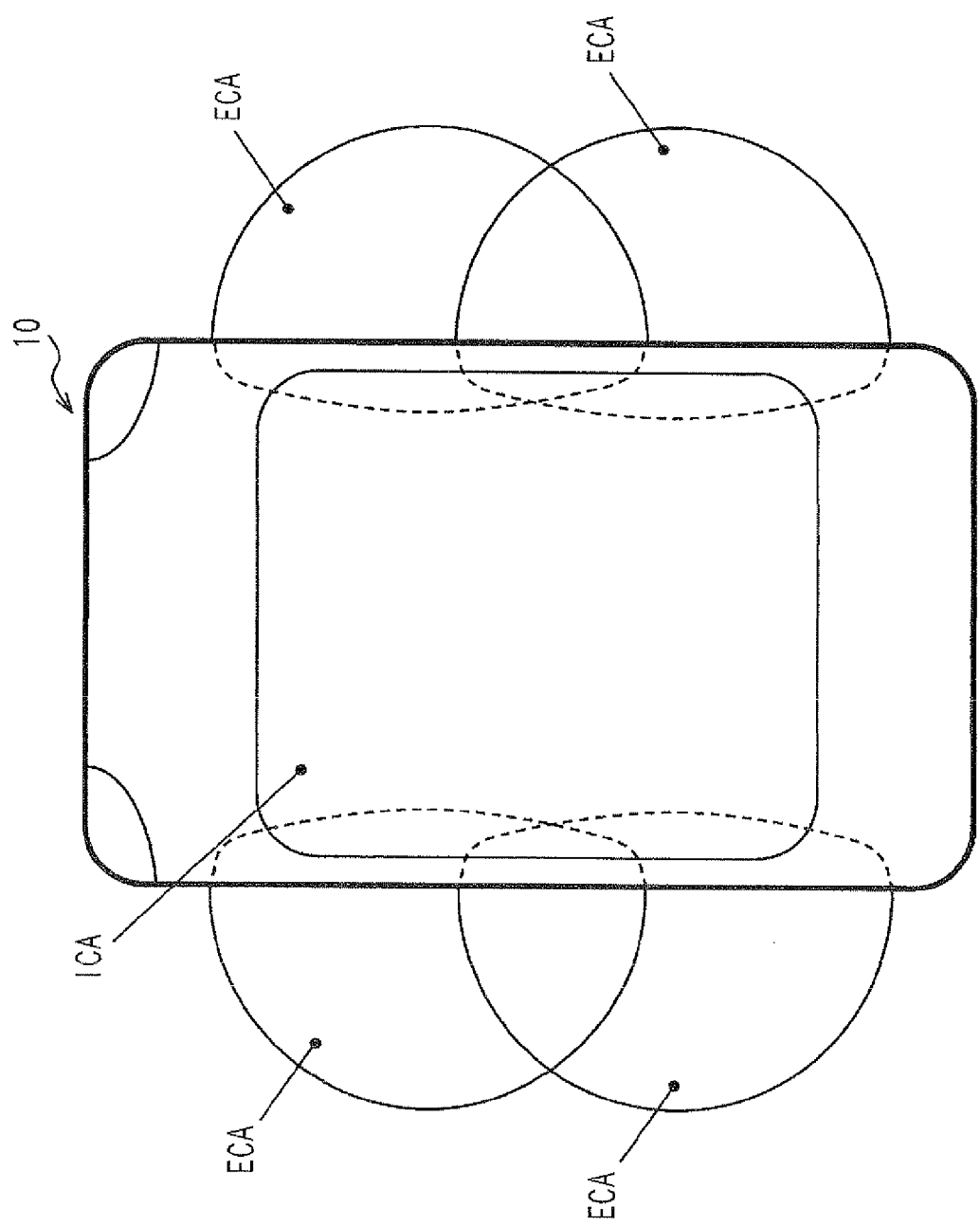
FIG. 2 is a diagram illustrating communication areas of an interior transmitter and exterior transmitters.

A request signal from each of the exterior transmitters 2a-2d can reach by a distance from 0.7 m to 1.0 m from corresponding one of the vehicle doors 11-14. When the vehicle 10 is parked in a state where all of the vehicle doors 11-14 are locked, exterior communication areas (ECA) between the exterior transmitters 2a-2d and the portable device 1 are periodically provided in the vicinity of the vehicle doors 11-14 in accordance with a reachable area of the request signal so that the smart entry system can detect that a user having the portable device 1 approaches the vehicle 10. Each of the exterior transmitters 2a-2d transmits the request signal to an outside of the vehicle. However, the request signal may leak to an inside of the vehicle 10 as shown by dashed lines in FIG. 2. Thus, even when the portable device 1 is disposed in the vehicle compartment, the portable device 1 may response to the request signal from one the exterior transmitters 2a-2d.

An interior communication area (ICA) between the interior transmitter 2e and the portable device 1 is provided when one of the vehicle doors 11 and 13 adjacent to a driver seat is opened and closed, when an engine is started, or when the vehicle doors 11-14 are locked, and thereby the smart entry system detects whether the portable device 1 is in the vehicle compartment. The interior transmitter 2e may include, for example, a front interior transmitter, a rear interior transmitter, and a cargo room transmitter. The front interior transmitter has a communication area covering a front seat. The rear interior transmitter has a communication area covering a rear seat. The cargo room transmitter has a communication area covering a cargo room including a trunk. In such a case, a total area of the communication areas of the front interior transmitter, the rear interior transmitter, and the cargo room transmitter covers the whole area of the vehicle compartment.

The vehicle-side unit is disposed in the vehicle compartment of the vehicle 10. The vehicle-side unit includes a receiver 3. The receiver 3 becomes a response-signal receivable state in synchronization with an output of the transmission order signal to the transmitters 2a-2e and receives the response signal from the portable device 1. The response signal received by the receiver 3 is output to the verification ECU 4. The verification ECU 4 executes a verification. For example, the verification ECU 4 determines whether the ID code included in the response signal corresponds to a code previously registered in the vehicle-side unit. In the verification ECU 4, the vehicle code, the key number code of each of the portable devices 1, and the ID code of each of the portable devices 1 are registered. The key number code and the ID code of each of the portable devices 1 is registered being related to corresponding one of the portable devices 1.

The verification ECU 4 controls the locking/unlocking state of the vehicle doors 11-14 and the allowing/prohibiting state of the engine starting with a body ECU 7 and a power source ECU 8 based on whether the verification of the received ID code is OK (satisfied) or NG (not satisfied).

The power source ECU 8 controls a power supply to each device mounted on the vehicle 10. The power source ECU 8 receives a signal from each sensor and each switch and determines whether an engine starting condition is satisfied. For example, the power source ECU 8 receives signals from an engine switch, a vehicle speed sensor, a shift position sensor, a stop lamp sensor, and a door courtesy lamp switch. The engine switch is disposed in the vicinity of the driver seat so that a user can control a starting and stopping of an engine. The vehicle speed sensor detects a speed of the vehicle. The shift position sensor detects a shift position of a transmission. The stop lamp switch outputs an ON signal when a driver treads on a brake pedal. The door courtesy lamp switch detects an opening and closing of the vehicle doors 11-14.

For example, when the brake pedal is trod on, the shift position is a parking, a vehicle speed is zero, and the engine switch is operated, the power source ECU 8 inquires the verification ECU 4 whether an interior verification is OK. The verification ECU 4 controls the interior transmitter 2e to transmit the request signal and the portable device 1 within the interior communication area transmits the response signal including the ID code in response to the request signal. The verification ECU 4 determines whether the ID code included in the response signal corresponds to the ID code previously stored in the verification ECU 4. If so, the verification ECU 4 determines that the interior verification is OK. When the power source ECU 8 receives a reply from the verification ECU 4 that the interior verification is OK, the power source ECU 8 determines that the engine starting condition is satisfied. Then, the power source ECU 8 activates a relay circuit 8a and supplies electric power from a battery (not shown) to each device mounted on the vehicle 10 through the relay circuit 8a. In addition, when interior verification is OK, the verification ECU 4 transmits an order signal to the engine ECU 9 so as to deactivate an immobilizer. Consequently, the engine ECU 9 can starts the engine. When the vehicle door is locked, the verification ECU 4 transmits an order signal to the engine ECU 9 so as to activate the immobilizer and prohibit the engine starting.

The body ECU 7 transmits a driving signal to lock controllers 5a-5d based on the lock order signal and the unlock order signal from the verification ECU 4.

The lock controllers 5a-5d are provided at the vehicle doors 11-14, respectively. Each of the lock controllers 5a-5d locks and unlocks the corresponding one of the vehicle doors 11-14 based on the driving signal from the body ECU 7. Each of the lock controllers 5a-5d includes a door lock motor that rotates in a normal direction and an inverse direction based on the lock order signal and the unlock order signal transmitted from the body ECU 7. Each of the lock controllers 5a-5d locks and unlocks the corresponding one of the vehicle doors 11-14 by a rotation of the door lock motor.

The vehicle doors 11-14 includes door handles 6a-6d, respectively. The door handles 6a-6d includes touch sensors 6a1-6d1 and door lock switches (SW) 6a2-6d2, respectively. Each of the touch sensors 6a1-6d1 detects that a user having the portable device 1 touches the corresponding one of the door handles 6a-6d. Each of the door lock switches 6a2-6d2 is a push switch. When a user pushes one of the door lock switches 6a2-6d2, corresponding one of the vehicle doors 11-14 is locked. Each of the door handles 6a-6d can function as an antenna of corresponding one of the exterior transmitters 2a-2d.

A device for detecting that a user having the portable device 1 touches one of the vehicle doors 11-14 is not limited to the touch sensors 6a1-6d1. For example, a detecting mechanism for mechanically detecting that one of the door handles 6a-6d is pulled may also be provided. Alternatively, the door handles 6a-6d may include unlock buttons, respectively. In this case, an operation of one the vehicle doors 11-14 can be detected when corresponding one of the unlock buttons is operated. Alternatively, each of the vehicle doors 11-14 may be include only one of the touch sensors 6a1-6d1 and the door lock switches 6a2-6d2 as an operated portion for locking and unlocking each of the vehicle doors 11-14.

The vehicle-side unit further includes a warning device 15. The warning device 15 warns, for example, when the portable device 1 is left in the vehicle compartment while the vehicle doors 11-14 are operated to be locked, when one of the vehicle doors 11-14 is open or not shut properly, or when the portable device is not found within the exterior communication areas and the interior communication area. In the vehicle-side unit, when the vehicle doors 11-14 are locked, each of the exterior transmitters 2a-2d and the interior transmitter 2e transmits the request signal. When the receiver 3 receives a response signal from the portable device 1 in response to the request signal from the interior transmitter 2e, the warning device 15 warns that the portable device 1 is left in the vehicle compartment. When the receiver 3 does not receive a response signal of the portable device 1 in response to the request signals from the exterior transmitters 2a-2d and the interior transmitter 2e, the warning device 15 warns that the portable device 1 is not found in the exterior communication areas and the interior communication area. The warning device 15 may warn by a voice alarm, a buzzer, or a light emitting, for example.

An example of a communication between the vehicle-side unit and the portable device 1 will be described with reference to FIG. 3A and FIG. 3B.

Figure 3:
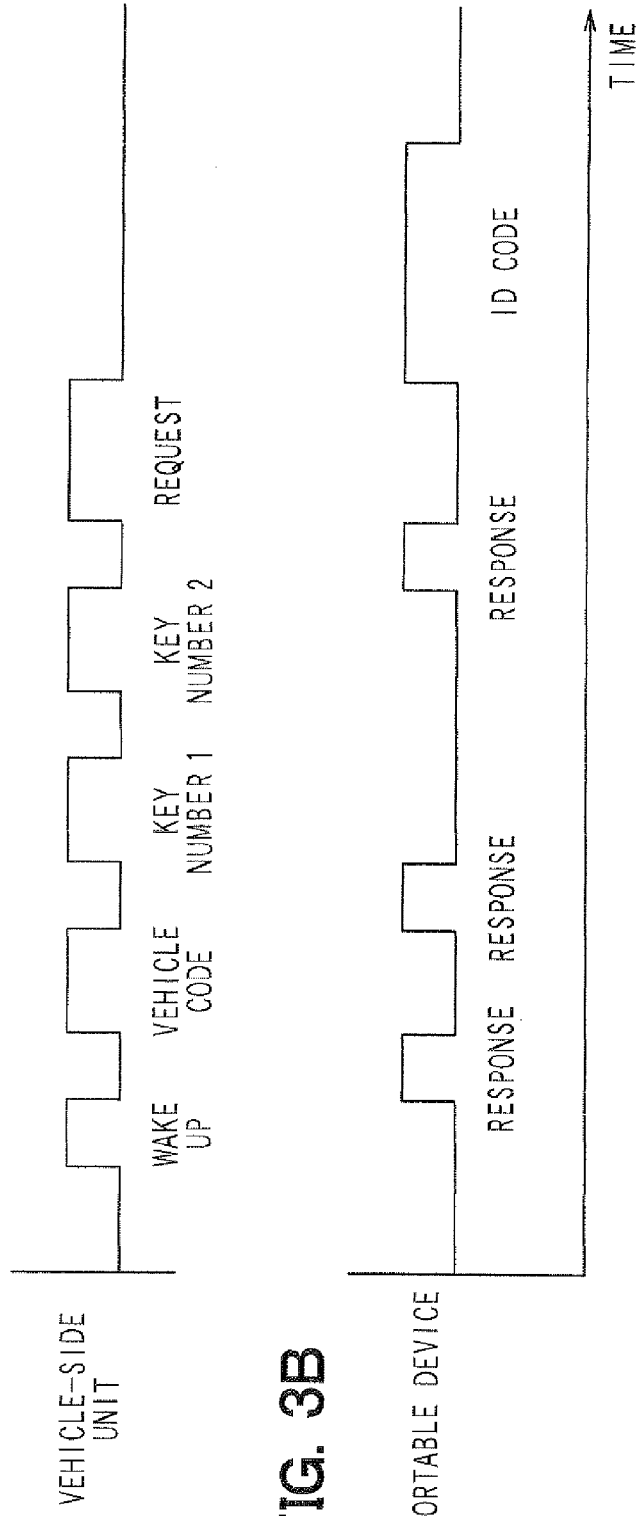
FIG. 3A and FIG. 3B are timing diagrams illustrating an example of a communication between a vehicle-side unit and a portable device.

As shown in FIG. 3A, the vehicle-side unit transmits a wake up signal as a first request signal from the exterior transmitters 2a-2d and the interior transmitter 2e. In the portable device 1, the portable device ECU 1c is usually in a sleeping state for restricting a waste of a battery. When the portable device 1 receives the wake up signal, the portable device ECU 1c wakes up, and the portable device 1 transmits a first response signal.

When the receiver 3 of the vehicle-side unit receives the response signal, the vehicle-side unit transmits a vehicle code as a second request signal. When the portable device 1 receives the vehicle code corresponding to the vehicle code stored therein, the portable device transmits a second response signal. The portable device 1 transmits the second response signal only when the vehicle code transmitted from the vehicle-side unit corresponds to the vehicle code stored therein. When the portable device 1 does not transmit the second response signal, the vehicle-side unit stops transmitting the request signal.

When the vehicle-side unit receives the second response signal, the vehicle-side unit transmits the key number codes in turn as a third request signal. The portable device 1 transmits a third response signal when the key number code transmitted from the vehicle-side unit corresponds to the key number code stored therein. In the example illustrated in FIG. 3A and FIG. 3B, the portable device 1 stores a key number code indicating "key number 2" and transmits the third response signal when the portable device 1 receives the key number code indicating "key number 2" from the vehicle-side unit.

When the vehicle-side unit receives the third response signal, the vehicle-side unit transmits a fourth request signal that requires a reply of the ID code. The portable device transmits the ID code in response to the fourth request signal.

Through the above-described communication with the vehicle-side unit and the portable device 1, the vehicle-side unit can receive the key number code and the ID code of the communicating portable device 1.

A process performed by the smart entry system according to the present embodiment for storing the ID code of the portable device 1 left in the vehicle compartment will be described with reference to FIG. 4.

In a case where a user tries to lock the vehicle doors 11-14 using the smart entry system, when one of the door lock switches 6a2-6d2 is operated, the interior transmitter 2e transmits a request signal and the interior verification is executed. In the interior verification, if the response signal is transmitted from the portable device 1 and the verification of the ID code is satisfied, the user may left the portable device 1 in the vehicle compartment. Thus, the vehicle-side unit does not lock the vehicle doors 11-14 and the warning device 15 warns a user that the portable device 1 is left in the vehicle compartment. Thus, in a case where a user tries to lock the vehicle doors 11-14 using the smart entry system, the smart entry system can prevent that the portable device 1 is locked in the vehicle compartment.

However, in a case where a user tries to lock the vehicle doors 11-14 using the mechanical key attached to the portable device 1 or in a case where a user tries to lock the vehicle doors 11-14 by operating a lock switch provided at the portable device 1, the vehicle doors 11-14 can be locked even when another portable device 1 is left in the vehicle compartment. Thus, the portable device 1 may be locked in the vehicle compartment. A process performed by the smart entry system when the vehicle doors 11-14 are locked using the wireless lock function of the portable device 1 is illustrated in FIG. 4.

At S100, it is determined whether there is a lock request from the wireless lock function. That is, it is determined whether a user operates the lock switch of the portable device 1, the lock request signal is transmitted from the portable device 1, and the vehicle-side unit receives the lock request signal. If it is determined that there is the lock request, the process proceeds to S110.

At S110, it is determined whether all of the vehicle doors 11-14 are closed. If it is determined that not all of the vehicle doors 11-14 are closed, at S120, the warning device 15 warns a user because all of the vehicle doors 11-14 cannot be locked. If it is determined that all of the vehicle doors 11-14 are closed, the process proceeds to S130 and all of the vehicle doors 11-14 are locked.

At S140, an interior verification is executed by transmitting the request signal from the interior transmitter 2e. In the interior verification, the vehicle-side unit communicates with the portable device 1 and receives the ID code from the portable device 1. The communication between the vehicle-side unit and the portable device 1 performed at S140 is not limited to the above-described example illustrated in FIG. 3A and FIG. 3B.

In the verification ECU 4 in the vehicle-side unit, the key number code and the ID code are previously stored in relation to each of the portable devices 1. Thus, the communication may end when the key number code is fixed, that is, when the vehicle-side unit receives the third response signal from the portable device 1 and the ID code of the portable device 1 may be identified based on the fixed key number code.

The portable device 1 can also be identified by the key number code instead of the ID code. When the key number code is fixed through the communication between the vehicle-side unit and the portable device, the portable device 1 left in the vehicle compartment may be identified by the key number code.

In the above-described communication, after the vehicle-side unit wakes up the portable device 1 the vehicle-side unit requests the portable device 1 to reply the response signals separately in response to the vehicle code and the key number. However, the vehicle-side unit may transmit the vehicle code and the key number code successively, and the portable device 1 may transmit a response signal when the vehicle code transmitted from the vehicle-side unit corresponds to the vehicle code stored therein and the key number code transmitted from the vehicle-side unit corresponds to the key number code stored therein.

At S150, it is determined whether the portable device 1 is left in the vehicle compartment based on whether the vehicle-side unit receives the ID code from the portable device 1. If it is determined that the portable device 1 is left in the vehicle compartment, the process proceeds to S160. If it is determined that the portable device 1 is not left in the vehicle compartment, the process ends.

At S160, the ID code of the portable device 1 locked in the vehicle compartment is stored. Alternatively, the key number code of the portable device 1 may be stored.

At S170, it is determined whether the interior verification for all of the portable devices 1 is finished. As described above, in the communication between the vehicle-side unit and the portable device 1, the vehicle-side unit transmits the key number codes in a predetermined order. The portable device 1 transmits the response signal when the key number code transmitted from the vehicle-side unit corresponds to the key number code stored therein. Thus, even after the vehicle-side unit receives the response signal from the portable device in response to the key number code, there is a possibility that another key number code to be transmitted remains. If a plurality of the portable device 1 is left in the vehicle compartment, the ID code of all of the portable devices 1 left in the vehicle compartment cannot be stored without transmitting the remaining key number code. Thus, at S170, it is determined whether the interior verification for all of the portable devices 1 is finished based on whether the key number code of portable device 1 that transmits the response signal is the last code in the key number codes to be transmitted in the predetermined order. If it is determined that the interior verification for all of the portable devices 1 is not finished, the process returns to S140 and the remaining key number code is transmitted so that the interior verification for all of the portable devices 1 is executed.

Figure 4:
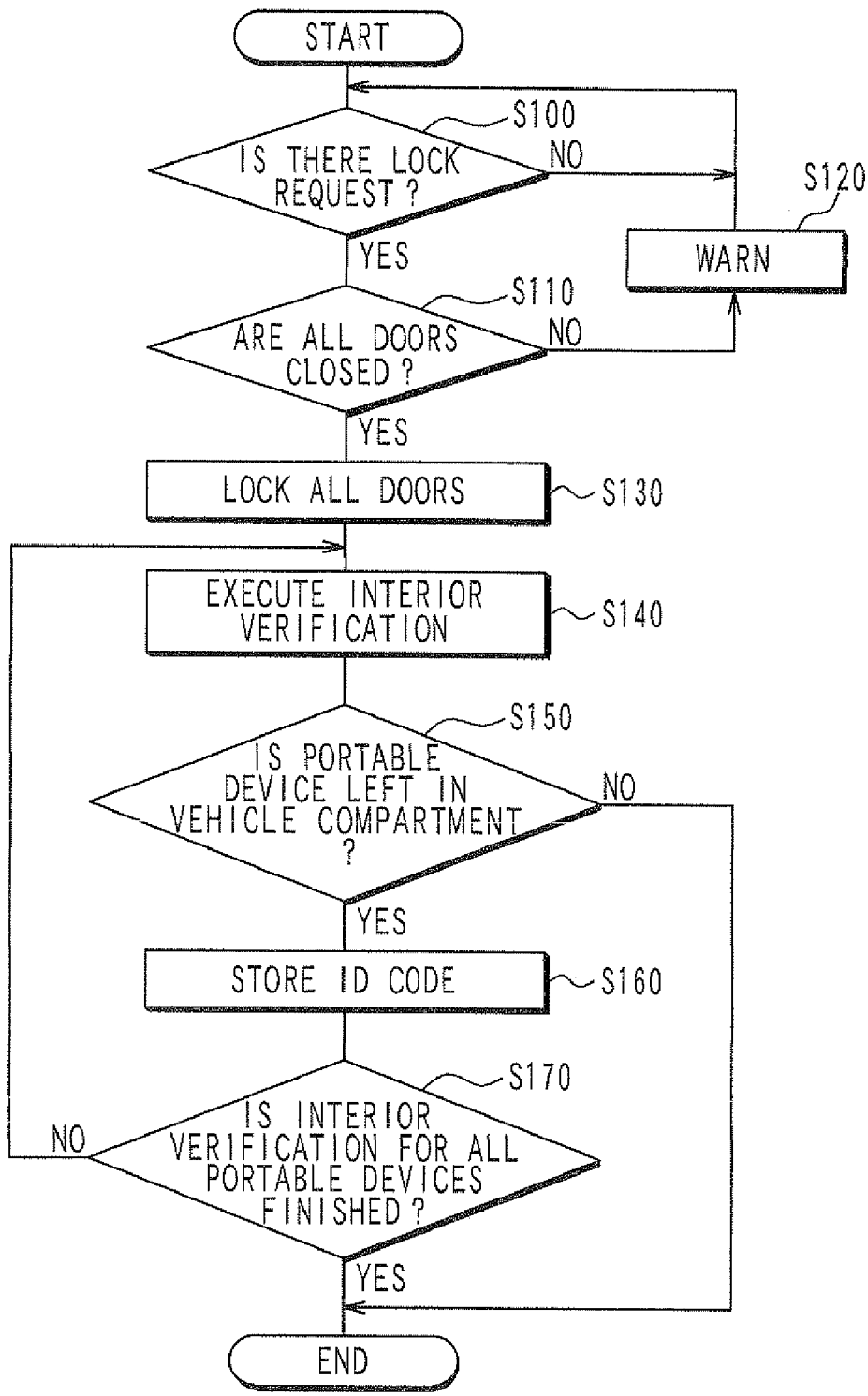
FIG. 4 is a flowchart illustrating a process performed by the smart entry system according to the first embodiment for storing an ID code of a portable device left in a vehicle compartment.

When all of the vehicle doors 11-14 are locked using the wireless function of the portable device 1 while another portable device 1 is left in the vehicle compartment, by executing the process illustrated in FIG. 4, information such as ID code for identifying the portable device 1 left in the vehicle compartment can be stored. When all of the vehicle doors 11-14 are mechanically locked using the mechanical key, the process from S130 is executed.

If the exterior transmitters 2a-2d periodically transmits the request signal while the portable device 1 is locked in the vehicle compartment, the portable device 1 may response to a radio wave entering the vehicle compartment. In this case, difficulty arises. For example, a person without the portable device 1 may unlock the vehicle doors 11-14 and the battery of the portable device 1 may be wasted by repeating the transmission of the response signal in response to the request signal periodically transmitted from the exterior transmitters 2a-2d. Thus, in the conventional smart entry system, when the vehicle doors 11-14 are locked while the portable device 1 is left in the vehicle compartment, the transmission of the request signal from the exterior transmitters 2a-2d is stopped.

However, if the transmission of the request signal from the exterior transmitters 2a-2d is completely stopped, a user having the portable device 1 cannot unlock the vehicle doors 11-14 using the smart entry system.

Figure 5:
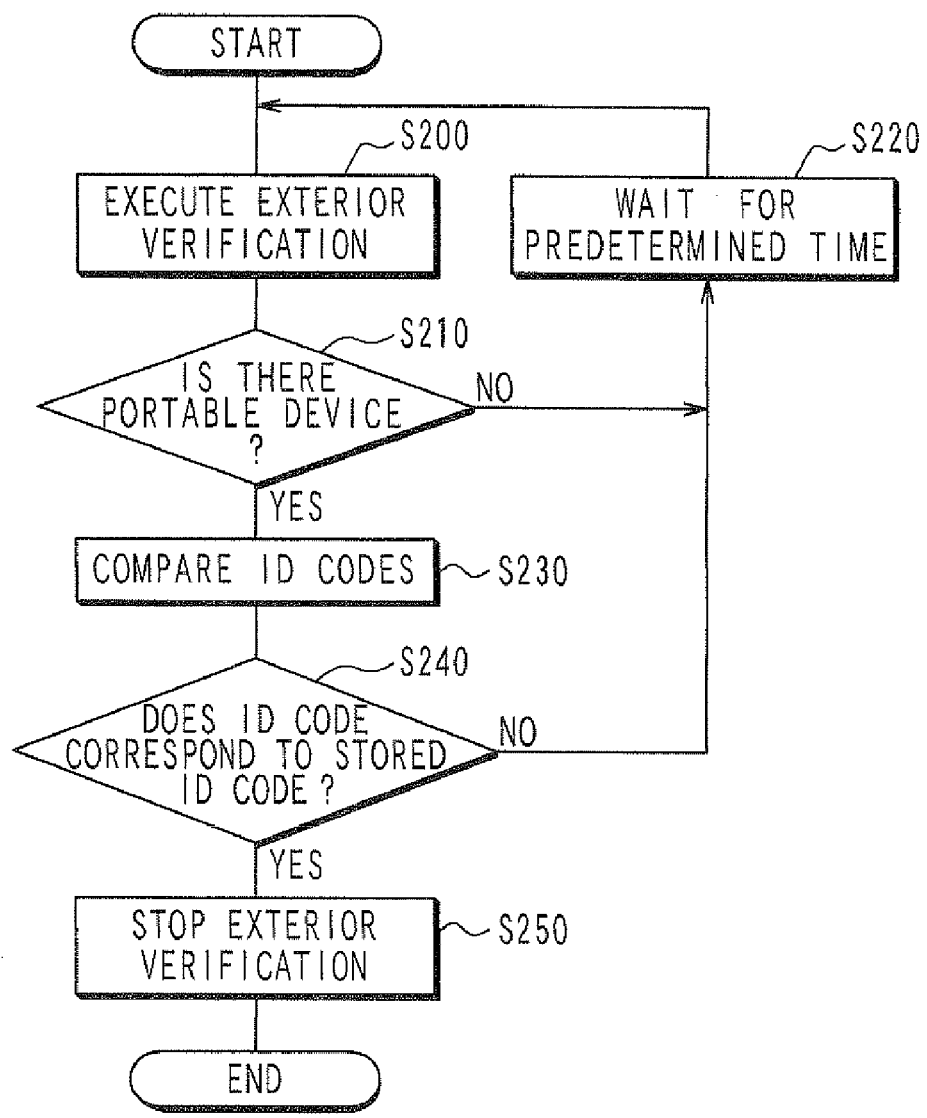
FIG. 5 is a flowchart illustrating a process performed by the smart entry system according to the first embodiment for controlling an exterior verification.

Thus, the smart entry system according to the present embodiment executes a process illustrated in FIG. 5 so that the user having the portable device 1 can unlock the vehicle doors 11-14 using the smart entry system. The process illustrated in FIG. 5 is executed when the vehicle 10 is parked in a state where all of the vehicle doors 11-14 are locked.

At S200, an exterior verification is executed by transmitting the request signal from the exterior transmitters 2a-2d. At S210, it is determined whether there is the portable device 1 within the exterior communication areas of the exterior transmitters 2a-2d based on whether a communication between the exterior transmitters 2a-2d and the portable device 1 is performed at S200. If it is determined that there is not the portable device 1 within the exterior communication areas of the exterior transmitters 2a-2d, the process proceeds to S220 and the process is waited for a predetermined time. After waiting for the predetermined time, the process returns to S200 and the exterior verification is executed. In this way, when the portable device 1 is not found, the exterior transmitters 2a-2d periodically transmit the request signal.

If it is determined that there is the portable device 1 within the exterior communication areas of the exterior transmitters 2a-2d at S210, the process proceeds to S230. At S230, the ID code or the key number code obtained by the exterior verification is compared with the ID code or the key number code stored at S160 in the process illustrated in FIG. 4. At S240, it is determined whether the ID code obtained by the exterior verification corresponds to the ID code stored at S160. If so, the process proceeds to S250 and the exterior verification is stopped. If it is determined that the ID code obtained by the exterior verification does not correspond to the ID code stored at S160, the process proceeds to S220 and the exterior verification is executed periodically.

In the present embodiment, the ID code of the portable device 1 locked in the vehicle compartment is stored. Thus, when the vehicle-side unit receives the response signal from the portable device 1 in response to the request signal periodically transmitted from the exterior transmitters 2a-2d, it can be determined whether the portable device 1 that transmitted the response signal is the portable device 1 locked in the vehicle compartment. When the portable device 1 other than the portable device 1 locked in the vehicle compartment transmits the response signal or when the vehicle-side unit does not receives the response signal, that is, when the portable device 1 locked in the vehicle compartment does not reply to the request signal from the exterior transmitters 2a-2d, even if the exterior transmitters 2a-2d continue to transmit the request signal periodically, a person without the portable device cannot unlock the vehicle doors 11-14. In addition, the battery of the portable device 1 locked in the vehicle compartment is restricted from being wasted. Thus, in the present embodiment, when the vehicle-side unit does not receive the response signal from the portable device 1 locked in the vehicle compartment, the exterior transmitters 2a-2d continue to periodically-transmit the request signal. Thus, a user having the portable device 1 other than the portable device 1 locked in the vehicle compartment can unlock the vehicle doors 11-14 using the smart entry system.

A process performed by the smart entry system for unlocking the vehicle doors 11-14 will be described below.

When the vehicle 10 is parked in a state where all of the vehicle doors 11-14 are locked, the exterior verification is periodically executed as described above.

The vehicle-side unit can determine which one of the vehicle doors 11-14 a user having the portable device 1 approaches, for example, by the following methods. In a first method, each of the exterior transmitters 2a-2d transmits the request signal including a transmitter-identification code unique to each of the exterior transmitters 2a-2d, and the portable device 1 replies the transmitter-identification code and the ID code as the response signal. Thereby, the vehicle-side unit can determine which one of the vehicle doors 11-14 the user having the portable device 1 approaches based on the transmitter-identification code included in the response signal. In a second method, the verification ECU 4 controls the exterior transmitters 2a-2d to transmit the request signal in turn. In this case, it can be determined which one of the vehicle doors 11-14 a user having the portable device approaches based on a time when the response signal from the portable device 1 is received.

When the portable device 1 transmits the response signal in response to the request signal transmitted from one of the exterior transmitters 2a-2d, the verification of the ID code is executed. If the verification ECU 4 determines that the verification of the ID code is satisfied, the verification ECU 4 determines a position of the user having the portable device 1 based on the door-identification code. Then, the verification ECU 4 transmits an order signal to the body ECU 7, and the body ECU 7 activates one of the touch sensors 6a1-6d1 so that the vehicle doors 11-14 corresponding to the position of the user becomes an unlock standby state.

When the user having the portable device 1 touches one of the door handles 6a-6d of the vehicle doors 11-14 set to be the unlock standby state, a door handle operation by the user is detected by corresponding one of the touch sensors 6a1-6d1 and the detected signal is transmitted to the verification ECU 4, The verification ECU 4 transmits an order signal to the body ECU 7, and thereby the body ECU 7 transmits the unlock order signal to the lock controllers 5a-5d of the vehicle doors 11-14 so as to unlock the vehicle doors 11-14.

Second Embodiment

Figure 6:
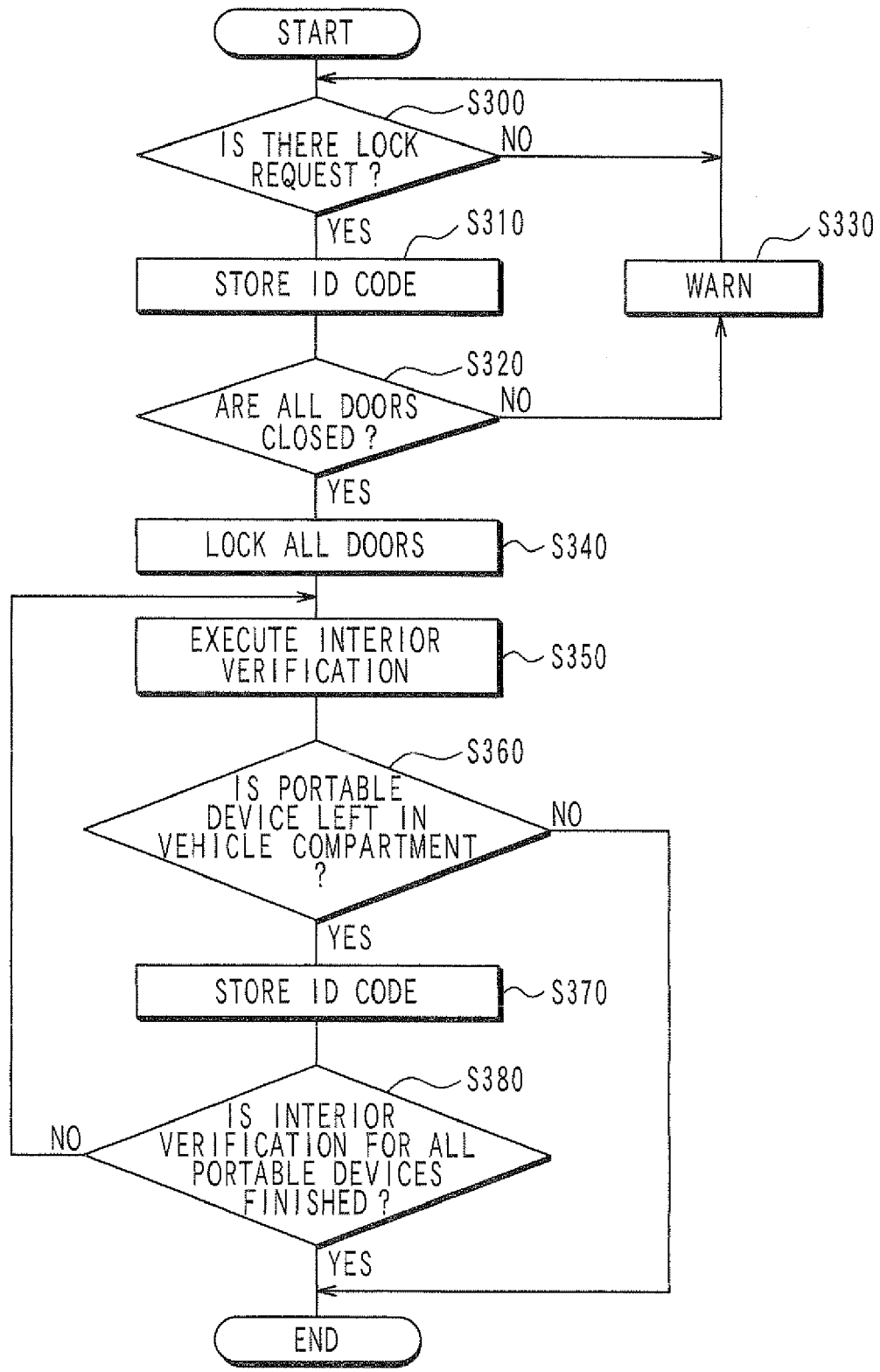
FIG. 6 is a flowchart illustrating a process performed by a smart entry system according to a second embodiment of the present invention for storing an ID code of a portable device left in a vehicle compartment.

A process performed by a smart entry system according to a second embodiment of the present invention will be described below. When a user having the portable device 1 tries to lock the vehicle doors 11-14 using the wireless lock function of the portable device 1, a process illustrated in FIG. 6 is executed.

At S300, it is determined whether there is a lock request from the wireless lock function. That is, it is determined whether a user operates the lock switch of the portable device 1, the lock request signal including ID code satisfying the verification is transmitted from the portable device 1, and the vehicle-side unit receives the lock request signal. If it is determined that there is the lock request, the process proceeds to S310. At S310, the ID code included in the lock request signal is stored so that the portable device 1 used for the wireless lock can be identified.

At S320, it is determined whether all of the vehicle doors 11-14 are closed. If it is determined that not all of the vehicle doors 11-14 are closed, at S330, the warning device 15 warns a user because all of the vehicle doors 11-14 cannot be locked. If it is determined that all of the vehicle doors 11-14 are closed, the process proceeds to S340 and all of the vehicle doors 11-14 are locked.

At S350, an interior verification is executed by transmitting the request signal from the interior transmitter 2e. In the interior verification, if the portable device 1 is left in the vehicle compartment, the vehicle-side unit communicates with the portable device 1 and receives the ID code from the portable device 1. The communication between the vehicle-side unit and the portable device 1 performed at S350 is not limited to the above-described example illustrated in FIG. 3A and FIG. 3B.

In the verification ECU 4 in the vehicle-side unit, the key number code and the ID code are stored in relation to each of the portable devices 1. Thus, the communication may end when the key number code is fixed, that is, when the vehicle-side unit receives the third response signal from the portable device 1 and the ID code of the portable device 1 may be identified based on the fixed key number code.

The portable device 1 can also be identified by the key number code instead of the ID code. Thus, when the key number code is fixed through the communication between the vehicle-side unit and the portable device 1, the portable device 1 left in the vehicle compartment may be identified by the key number code.

In the above-described communication, after the vehicle-side unit wakes up the portable device 1, the vehicle-side unit requests the portable device 1 to reply the response signals separately in response to the vehicle code and the key number. However, the vehicle-side unit may transmit the vehicle code and the key number code successively, and the portable device 1 may transmit a response signal when the vehicle code transmitted from the vehicle-side unit corresponds to the vehicle code stored therein and the key number code transmitted from the vehicle-side unit corresponds to the key number code stored therein.

At S360, it is determined whether the portable device 1 is left in the vehicle compartment based on whether the vehicle-side unit receives the ID code from the portable device 1 during the interior verification at S350. If it is determined that the portable device 1 is left in the vehicle compartment, the process proceeds to S370. If it is determined that the portable device 1 is not left in the vehicle compartment, the process illustrated in FIG. 6 ends.

At S370, the ID code of the portable device 1 locked in the vehicle compartment is stored. Alternatively, the key number code of the portable device 1 may be stored.

At S380, it is determined whether the interior verification for all the portable devices 1 is finished. As described above, in the communication between the vehicle-side unit and the portable device 1, the vehicle-side unit transmits the key number code in a predetermined order. The portable device 1 transmits the response signal when the key number code transmitted from the vehicle-side unit corresponds to the key number code stored therein. Thus, even after the vehicle-side unit receives the response signal from the portable device in response to the key number code, there is a possibility that another key number code to be transmitted remains. If a plurality of the portable device 1 is left in the vehicle compartment, the ID code of all the portable devices 1 left in the vehicle compartment cannot be stored without transmitting the remaining key number code. Thus, at S380, it is determined whether the interior verification of all the portable devices 1 is finished based on whether the key number code of portable device 1 that transmits the response signal is the last code in the key number codes to be transmitted in the predetermined order. If it is determined that the interior verification for all the portable device 1 is not finished, the process returns to S350 and the remaining key number code is transmitted so that the interior verification for all the portable devices 1 is executed.

When all of the vehicle doors 11-14 are locked using the wireless function of the portable device 1 while another portable device 1 is left in the vehicle compartment, by executing the process illustrated in FIG. 6, information such as ID code for identifying the portable device 1 left in the vehicle compartment can be stored. When all of the vehicle doors 11-14 are mechanically locked using the mechanical key, the process from S340 is executed.

If the exterior transmitters 2a-2d periodically transmits the request signal while the portable device 1 is locked in the vehicle compartment, the portable device 1 may response to a radio wave entering the vehicle compartment. In this case, difficulty arises. For example, a person without the portable device 1 may unlock the vehicle doors 11-14 and the battery of the portable device 1 may be wasted by repeating the transmission of the response signal in response to the request signal periodically transmitted from the exterior transmitters 2a-2d. Thus, in the conventional smart entry system, when the vehicle doors 11-14 are locked while the portable device 1 is left in the vehicle compartment, the transmission of the request signal from the exterior transmitters 2a-2d is completely stopped.

However, if the transmission of the request signal from the exterior transmitters 2a-2d is completely stopped, a user having the portable device 1 cannot unlock the vehicle doors 11-14 using the smart entry system.

Figure 7:
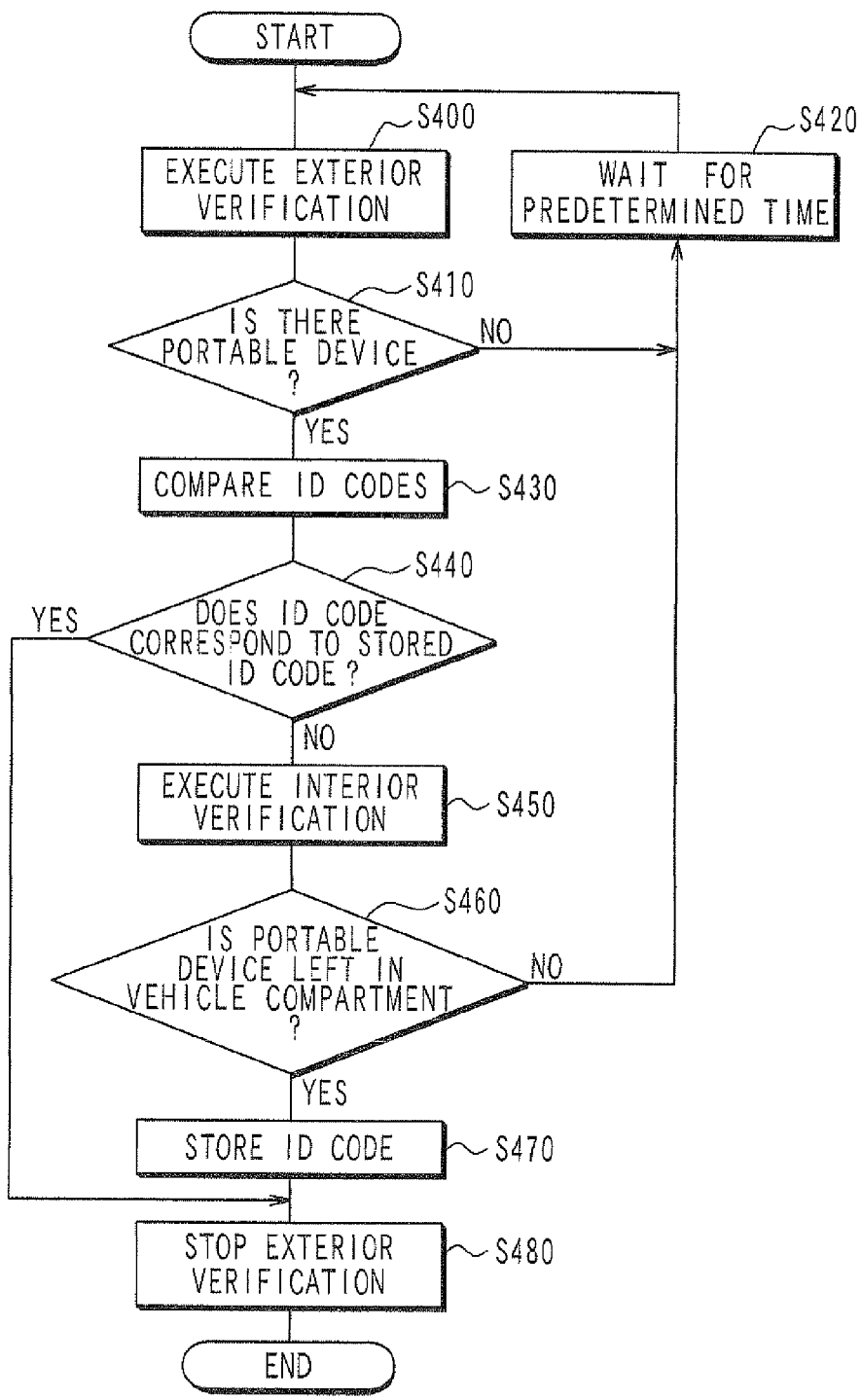
FIG. 7 is a flowchart illustrating a process performed by the smart entry system according to the second embodiment for controlling an exterior verification.
Figures 8, 9:
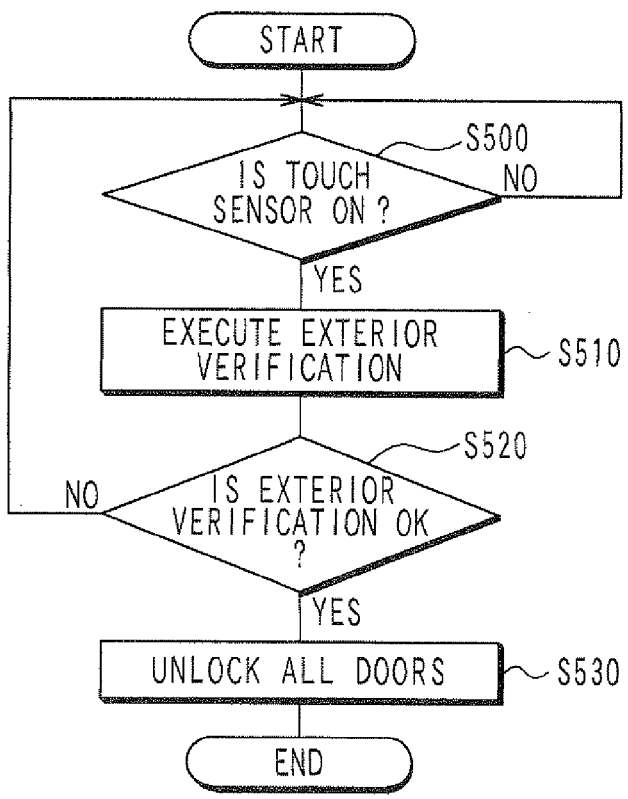
FIG. 8 is a flowchart illustrating a process performed by the smart entry system according to the second embodiment for enabling an unlocking of the vehicle doors using the smart entry system when a periodical exterior verification is stopped.
FIG. 9 is a diagram illustrating exemplary priorities when a vehicle-side unit transmits a key number code.

Thus, in the present embodiment, processes illustrated in FIG. 7 and FIG. 8 are executed so that the user having the portable device 1 can unlock the vehicle doors 11-14 using the smart entry system. The process illustrated in FIG. 7 is executed when the vehicle 10 is parked in a state where all of the vehicle doors 11-14 are locked. The process illustrated in FIG. 8 is executed when the periodical exterior verification is stopped due to the process illustrated in FIG. 7.

At S400, an exterior verification is executed by transmitting the request signal from the exterior transmitters 2a-2d. At S410, it is determined whether there is the portable device 1 within the exterior communication areas of the exterior transmitters 2a-2d based on whether communication between the exterior transmitters 2a-2d and the portable device 1 is performed at S400. If it is determined that there is not the portable device 1 within the exterior communication areas of the exterior transmitters 2a-2d, the process proceeds to S420 and the process is waited for a predetermined time. After waiting for the predetermined time, the process returns to S400 and the exterior verification is executed again. In this way, when the portable device 1 is not found, the exterior transmitters 2a-2d periodically transmit the request signal.

If it is determined that there is the portable device 1 within the exterior communication areas of the exterior transmitters 2a-2d at S410, the process proceeds to S430. At S430, the ID code or the key number code obtained by the exterior verification is compared with the ID code or the key number code stored at S370 in the process illustrated in FIG. 6. At S440, it is determined whether the ID code obtained by the exterior verification corresponds to the ID code stored at S370. If so, the process proceeds to S480 and the exterior verification is stopped.

In the present embodiment, the ID code of the portable device 1 locked in the vehicle compartment is stored. Thus, when the vehicle-side unit receives the response signal from the portable device 1 in response to the request signal periodically transmitted from the exterior transmitters 2a-2d, it can be determined whether the portable device 1 that transmitted the response signal is the portable device 1 locked in the vehicle compartment. In a case where the portable device 1 locked in the vehicle compartment transmits the response signal, if the exterior transmitters 2a-2d continue to transmit the request signal periodically, a person without the portable device 1 can unlock the vehicle doors 11-14. In addition, if the portable device 1 locked in the vehicle compartment continue to transmit the response signal, the battery of the portable device 1 may be wasted. Thus, when it is determined that the portable device 1 that transmitted the response signal in response to the request signal from the exterior transmitters 2a-2d is the portable device locked in the vehicle compartment, the exterior transmitters 2a-2d are stopped periodically transmitting the request signal.

At 3440, if it is determined that the ID code obtained by the exterior verification does not correspond to the stored ID code, the process proceeds to S450. At S450, the interior verification is executed by transmitting the request signal from the interior transmitter 2e. The interior verification is executed at S450 because the portable device 1 that was not in the vehicle compartment when a user locked the vehicle doors 11-14 may be left in the vehicle compartment after vehicle doors 11-14 are locked. For example, in a case where a user does not want to wet the portable device 1, there is a possibility that the user leaves a window open a little, the user takes out the mechanical key from the portable device 1 after locking the vehicle doors 11-14, and the user throws in the portable device from a clearance provided at an upper portion of the window. Thus, when the portable device 1 is detected at the exterior verification, the interior verification is executed at S450. In the interior verification, the vehicle-side unit may transmit only the key number code of the portable device 1 detected at the exterior verification at S400. Alternatively, the vehicle-side unit may transmit the key number codes of the all of the portable devices 1.

At S460, if it is determined that the portable device 1 detected at the interior verification at S450 corresponds to the portable device 1 detected at the exterior verification at S400, the process proceeds to S470. At S470, the ID code of the portable device 1 left in the vehicle compartment is stored. Then, the process proceeds to S480 and the exterior verification is stopped. At S460, if it is determined that the portable device 1 detected at the exterior verification at S400 is not detected at the interior verification at S450, the process proceeds to S420 and the exterior verification is executed periodically.

In a case where the portable device 1 other than the portable device 1 locked in the vehicle compartment or in a case where the vehicle-side unit does not receive the response signal from the portable device 1, even if the exterior transmitters 2a-2d continue to transmit the request signal periodically, a person without the portable device 1 cannot unlock the vehicle doors 11-14. In addition, the smart entry system can restrict that the battery of the portable device 1 locked in the vehicle compartment is wasted. Thus, in the present embodiment, when the vehicle-side unit does not receive the response signal from the portable device 1 locked in the vehicle compartment, the exterior transmitters 2a-2d continue to transmit the request signal periodically.

If the exterior verification at S400 in the process illustrated in FIG. 7 is satisfied and the ID code of the detected portable device 1 is not the ID code of the portable device 1 locked in the vehicle compartment, the vehicle-side unit becomes an unlock standby state. When the vehicle-side unit is in the unlock standby state, the verification ECU 4 activates one of the touch sensors 6a1-6d1 of the vehicle doors 11-14 which a user having the portable device 1 approaches, and thereby the vehicle-side unit can detect a door handle operation by the user.

The vehicle-side unit can determine which one of the vehicle doors 11-14 the user having the portable device 1 approaches, for example, by the following methods. In a first method, each of the exterior transmitters 2a-2d transmits the request signal including a transmitter-identification code unique each of the exterior transmitters 2a-2d and the portable device 1 replies the transmitter-identification code and the ID code as the response signal. Thereby, the vehicle-side unit can determine which one of the vehicle doors 11-14 the user having the portable device 1 approaches based on the transmitter-identification code included in the response signal. In a second method, the verification ECU 4 controls the exterior transmitters 2a-2d to transmit the request signal in turn. In this case, it can be determined which one of the vehicle doors 11-14 a user having the portable device approaches based on a time when the response signal from the portable device 1 is received.

When the user having the portable device 1 touches one of the door handles 6a-6d of the vehicle doors 11-14 set to be the unlock standby state, a door handle operation by the user is detected by corresponding one of the touch sensors 6a1-6d1 and the detected signal is transmitted to the verification ECU 4. The verification ECU 4 transmits an order signal to the body ECU 7, and thereby the body ECU 7 transmits the unlock order signal to the lock controllers 5a-5d of the vehicle doors 11-14 so as to unlock the vehicle doors 11-14.

Next, the process performed by the smart entry system when the periodical exterior verification is stopped will be described with reference to FIG. 8.

At S500, it is determined whether a door handle operation is detected by one of the touch sensors 6a1-6d1. The touch sensors 6a1-6d1 are periodically activated or normally activated so that the door handle operation can be detected by the touch sensors 6a1-6d1.

At S500, if it is determined that the door handle operation is detected by one of the touch sensors 6a1-6d1, the process proceeds to S510. At S510 only one of the exterior transmitters 2a-2d that is disposed at the vehicle door attached with the door handles 6a-6d operated by the user transmits the request signal so as to communicate with the portable device 1. Thus, it can be determined quickly whether a person operating one of the door handles 6a-6d has the portable device 1.

In the communication between the vehicle-side unit and the portable device 1 during the exterior verification at S510, the key number code of the portable device 1 locked in the vehicle compartment is removed from the key number codes transmitted from the exterior transmitters 2a-2d. Thus, it can be determined quickly whether the person operating one of the door handles 6a-6d has the portable device 1 other than the portable device 1 locked in the vehicle compartment.

In addition, during the exterior verification at S510, priorities of the portable devices 1 with which the vehicle-side unit tries to communicate are established based on a past usage record of each of the portable devices 1, and the key number codes are transmitted in accordance with the priorities. For example, the portable device 1 last used for locking the vehicle doors 11-14 is given the first-order priority, the portable device 1 last used for deactivating the immobilizer is given the second-order priority, the portable device 1 that is previously used is given the third-order priority, the portable device 1 that is previously unused is given the fourth-order priority, as illustrated in FIG. 9. When a plurality of the portable devices 1 is set to be the same-order priority, a smaller key number code is given higher priority. The key number code of the portable device 1 left in the vehicle compartment is not transmitted. By establishing the priorities of the key number codes, when a person operating one of the door handles 6a-6d has the portable device 1, the vehicle-side unit can communicate with the portable device 1 more efficiently.

At S520, it is determined whether the vehicle-side unit communicates with the portable device 1 at the exterior verification, and whether the verification of the ID code is satisfied. If it is determined that the exterior verification is not satisfied (NG), the process returns to S500. If it is determined that the exterior verification is satisfied (OK), the process proceeds to S530. At S530, the body ECU 7 transmits the unlock order signal to the lock controllers 5a-5d, and thereby the vehicle doors 11-14 are unlocked.

In the present embodiment, the process illustrated in FIG. 8 is executed while the periodical transmission of the request signal from the exterior transmitters 2a-2d is stopped. When the vehicle-side unit detects that one of the door handles 6a-6d is operated, the exterior transmitters 2a-2d transmits the request signal so as to communicate with the portable device 1. If the vehicle-side unit can communicate with the portable device 1 and the verification of the ID code is satisfied, it can be determined that a person trying to unlock the vehicle doors 11-14 has the portable device 1 other than the portable device 1 locked in the vehicle compartment. Thus, the user having the portable device 1 other than the portable device 1 locked in the vehicle compartment can be unlock the vehicle doors 11-14 using the smart entry system.

Although the present invention has been fully described in connection with the exemplary embodiments thereof with reference to the accompanying drawings, it is to be noted that various changes and modifications will become apparent to those skilled in the art.

For example, during the exterior verification at S510 in the process illustrated in FIG. 8, the key number codes other than the key number code of the portable device 1 locked in the vehicle compartment are transmitted. Alternatively, all the key number code may be transmitted. In this case, if the vehicle-side unit receives the response signal only at a time when the key number code of the portable device 1 locked in the vehicle compartment is transmitted, it is determined that the exterior verification is NG.

What is claimed is:

1. A smart entry system comprising a vehicle-side unit and a plurality of portable devices,
the vehicle-side unit including:
an exterior transmitter configured to transmit a request signal to an exterior communication area provided at an outside of a vehicle;
an interior transmitter configured to transmit a request signal to an interior communication area provided in a vehicle compartment of the vehicle;
a receiver;
a discrimination code storing portion;
an unlock permitting portion; and
an unlocking portion,
each of the plurality of portable devices having a discrimination code different from each other, each of the plurality of portable devices configured to transmit a response signal including an ID code in response to the request signal from the vehicle-side unit, wherein:
when all of doors of the vehicle are locked, the discrimination code storing portion controls the interior transmitter to transmit the request signal, and when the receiver receives the response signal from a first portable device of the plurality of portable devices and the discrimination code storing portion receives the discrimination code of the first portable device through a communication of the first portable device, the discrimination code storing portion stores the discrimination code of the first portable device;
when the vehicle is parked in a state where all of the doors are locked, the unlock permitting portion controls the exterior transmitter to periodically-transmit the request signal, and when the receiver receives the response signal from a second portable device of the plurality of portable devices and the unlock permitting portion receives the discrimination code of the second portable device through a communication with the second portable device, the unlock permitting portion controls the exterior transmitter to continue to periodically-transmit the request signal on a condition that the discrimination code of the second portable device is different from the discrimination code of the first portable device stored in the discrimination code storing portion;
when the exterior transmitter periodically-transmits the request signal, the receiver receives the response signal from a third portable device of the plurality of portable devices and the ID code included in the response signal corresponds to an ID code previously registered in the vehicle-side unit, the unlock permitting portion permits an unlocking of one of the doors which a user having the third portable device approaches; and
the unlocking portion unlocks the one of the doors based on a permission by the unlock permitting portion.

2. The smart entry system according to claim 1, wherein:
each of the plurality of the portable devices has the ID code different from each other; and
the discrimination code storing portion stores the ID code as the discrimination code.

3. The smart entry system according to claim 1, wherein:
each of the plurality of the portable devices has a key number code indicating a key number of each of the plurality of portable devices; and
the discrimination code storing portion stores the key number code as the discrimination code.

4. The smart entry system according to claim 1, wherein the discrimination code storing portion is configured to try the communication for receiving the discrimination code with all of the plurality of portable devices.

5. A smart entry system comprising a vehicle-side unit and a plurality of portable devices,
the vehicle-side unit includes:
an exterior transmitter configured to transmit a request signal to an exterior communication area provided at an outside of a vehicle;
an interior transmitter configured to transmit a request signal to an interior communication area provided in a vehicle compartment of the vehicle;
a receiver;
a discrimination code storing portion;
an operated portion attached to one of doors of the vehicle to be operated by a user for unlocking the one of the doors;
a first unlock control portion; and
a second unlock control portion,
each of the plurality of portable devices having a discrimination code different from each other, each of the plurality of portable devices configured to transmit a response signal including an ID code in response to the request signal from the vehicle-side unit, wherein;
when all of the doors are locked, the discrimination code storing portion controls the interior transmitter to transmit the request signal, and when the receiver receives the response signal from a first portable device of the plurality of portable devices and discrimination code storing portion receives the discrimination code of the first portable device through a communication with the first portable device, the discrimination code storing portion stores the discrimination code of the first portable device;
when the vehicle is parked in a state where all of the doors are locked, the first unlock control portion controls the exterior transmitter to periodically-transmit the request signal, and when the receiver receives the response signal from a second portable device of the plurality of portable devices, the first unlock control portion receives the discrimination code of the second portable device through a communication with the second portable device, and the discrimination code of the second portable device corresponds to the discrimination code of the first portable device stored in the discrimination code storing portion, the first unlock control portion controls the exterior transmitter to stop periodically-transmitting the request signal;

when the exterior transmitter periodically-transmits the request signal, the receiver receives the response signal from a third portable device of the plurality of portable devices, the ID code included in the response signal corresponds to an ID code previously registered in the vehicle-side unit, and a user having the third portable device operates the operated portion, the first unlock control portion unlocks the one of the doors; and when the exterior transmitter stops periodically-transmitting the request signal and the operated portion is operated, the second unlock control portion controls the exterior transmitter to transmit the request signal, and when the receiver receives the response signal from a fourth portable device of the plurality of portable devices, the second unlock control portion receives the discrimination code of the fourth portable device through a communication with the fourth portable device, the discrimination code of the fourth portable device is different from the discrimination code of the first portable device stored in the discrimination code storing portion, and the ID code included in the response signal corresponds to the ID code previously registered in the vehicle-side unit, the second unlock control portion unlocks the one of the doors.

6. The smart entry system according to claim 5, wherein:
the exterior transmitter is disposed at each of the doors;
the operated portion is attached to each of the doors; and
the request signal is transmitted from only the exterior transmitter disposed at one of the doors which is attached with the operated portion operated by a user.

7. The smart entry system according to claim 5, wherein:
each of the plurality of the portable devices has a key number code indicating a key number of each of the plurality of portable devices;
the discrimination code storing portion stores the key number code as the discrimination code; and
the second unlock control portion removes a portable device of the plurality of portable devices whose key number code is stored in the discrimination code storing portion from a list of portable devices with which the second unlock control portion tries to communicate.

8. The smart entry system according to claim 7, wherein
the second unlock control portion determines priorities of the portable devices with which the second unlock control portion tries to communicate based on a past usage record of each of plurality of portable devices.

9. The smart entry system according to claim 5, wherein:
each of the plurality of portable devices has the ID code different from each other; and
the discrimination code storing portion stores the ID code as the discrimination code.

10. The smart entry system according to claim 5, wherein:
each of the plurality of portable devices has a key number code indicating a key number of each of the plurality of portable devices; and
the discrimination code storing portion stores the key number code as the discrimination code.

11. The smart entry system according to claim 5, wherein
the discrimination code storing portion is configured to try the communication for receiving the discrimination code with all of the plurality of portable devices.

* * * * *